United States Patent
Watanabe et al.

(10) Patent No.: US 6,459,958 B1
(45) Date of Patent: Oct. 1, 2002

(54) OPERATION DATA DISPLAY DEVICE FOR ROBOT

(75) Inventors: Atsushi Watanabe, Tokyo; Tetsuya Kosaka, Yamanashi, both of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 10/001,990

(22) Filed: Dec. 5, 2001

(30) Foreign Application Priority Data

Dec. 7, 2000 (JP) ........................................ 2000/373142

(51) Int. Cl.$^7$ .............................................. G05B 15/00
(52) U.S. Cl. .................... 700/264; 700/245; 700/246; 700/248; 700/249; 700/251; 700/253; 700/254; 700/255; 700/257; 700/259; 700/260; 318/568.12; 318/568.14; 318/568.21; 318/568.23; 219/130.4; 219/121.66; 701/2; 701/4; 701/23
(58) Field of Search ................................ 700/264, 255, 700/251, 257, 245, 246, 248, 249, 253, 254, 259, 260; 318/568.13, 568.14, 568.21, 568.23; 219/130.4, 121.46; 701/2, 24, 23

(56) References Cited

U.S. PATENT DOCUMENTS

| | | | | |
|---|---|---|---|---|
| 5,006,688 A | * | 4/1991 | Cross ....................... | 219/130.4 |
| 5,157,236 A | * | 10/1992 | Batzler et al. ............... | 370/259 |
| 6,096,994 A | * | 8/2000 | Handa et al. ............. | 219/130.5 |
| 6,249,718 B1 | * | 6/2001 | Gilliland et al. ............. | 700/255 |
| 6,282,460 B2 | * | 8/2001 | Gilliland et al. ............ | 700/255 |

OTHER PUBLICATIONS

Ozcelik, An animated MATLAB/SIMULINK tool for gas metal arc welding control experimentation, 1998, IEEE, pp. 1767–1771.*

Doumanidis, Multiplexed and distributed control of automated welding, 1994, IEEE, pp. 13–24.*

Steves, et al., SMAT: Synchronous multimedia and annotation tool, no date, Internet, pp. 1–10.*

* cited by examiner

Primary Examiner—William A. Cuchlinski, Jr.
Assistant Examiner—McDieunel Marc
(74) Attorney, Agent, or Firm—Staas & Halsey LLP

(57) ABSTRACT

An operation data display device for a robot allowing an operator to recognize operation data on a plurality of operations performed by the robot at a time. When an arc start command is read out from a taught operation program by the robot controller, a welding start command is issued to an arc welding power supply. The arc welding power supply starts supply of a welding current to a welding torch mounted on a robot. Values of the welding current in a welding operation is outputted to a robot controller and sampled at every predetermined period and recorded. When an arc end command is read out from the operation program, the arc welding power supply terminates the welding operation and output of the values of the welding current. The robot controller transfers a file containing the data of the actual welding current to a personal computer. The personal computer displays representations of the received operation data in the form of line graphs of reduced size for the plurality of welding operations: in one frame on a display screen.

14 Claims, 6 Drawing Sheets

OPERATION DATA DISPLAY DEVICE FOR ROBOT

BACKGROUND OF THE INVENTION

1. Field of the Invention

The present invention relates to an operation data display device for displaying information on an operation state of a robot, which performs operations such as arc welding, on a display screen.

2. Description of the Related Art

As well known in the art, an industrial robot performs a series of predetermined operations such as arc welding operations by successively moving a tool mounted on the robot and making input/output of signals for the operations in accordance with an operation program taught to the robot in advance.

It has been adopted to a method of recording data concerning robot operations in operating the robot in time series and analyzing a state of the robot operation referring to the recorded data after finishing the operations at appropriate opportunity (for example, each time when operations of one lot are completed), so as to utilize the analysis for the robot operations thereafter. The data on each of the robot operations are displayed on a display screen of the display device in the form of a graph for each operation of the robot for the analysis of the data.

In the above conventional method, the analysis on each robot operation can be performed easily based on the displayed data, but it is difficult to grasp the whole tendency of a series of robot operations and it is laborious for an operator to grasp a general tendency of the plurality of robot operations.

SUMMARY OF THE INVENTION

An object of the present invention is to provide an operation data display device capable of grasping a tendency of operation data on a plurality of operations performed by a robot and also easily analyzing the whole operation data.

An operation data display device of the present invention comprises: a robot controller for controlling a robot to perform operations in accordance with an operation program; and a data processing device connected with the robot controller.

According to an aspect of the present invention, the robot controller may include means for obtaining operation data on an operation state of the robot for each operation of the robot and storing the operation data in time series, and means for transferring the stored operation data to said data processing device. The data processing device may include storing means for storing the operation data transferred from the robot controller, a display device for providing a frame of picture on a display screen and means for displaying a plurality of representations of the stored operation data on a plurality of robot operations in the form of graphs of reduced size in one frame on the display screen of the display device.

According to another aspect of the present invention, the robot controller may include means for successively obtaining operation data on an operation state of the robot for each operation of the robot and means for transferring the operation data to said data processing device. The data processing device may include storing means for storing the operation data for each operation transferred from the robot controller in time series, a display device for providing a frame of picture on a display screen and means for displaying a plurality of representations of the operation data on a plurality of robot operations in the form of graphs of reduced size in one frame on the display screen of the display device.

The data processing device may include means for allowing selection of one of the plurality of representations of the operation data and displaying only the selected one in the form of a graph of enlarged size in one frame on the display screen. The data processing device may further include means for displaying a plurality of representations of the stored operation data in the form of icons with indications of sequence or time/date of the operations in one frame on the display screen.

Further, the data processing device may include means for allowing addition of a mark indicating abnormality of the operation data on the representation thereof, means for sorting the representations of the operation data in time series in one frame on the display screen and means for displaying only the representations of the abnormal operation data in one frame on the display screen.

The operations performed by the robot are not particularly restricted. The operations may be arc welding operations as typical example and in this case, the operation data may be indicative of welding current in the arc welding operation.

DETAILED DESCRIPTION OF THE PREFERRED EMBODIMENTS

Figure 1:
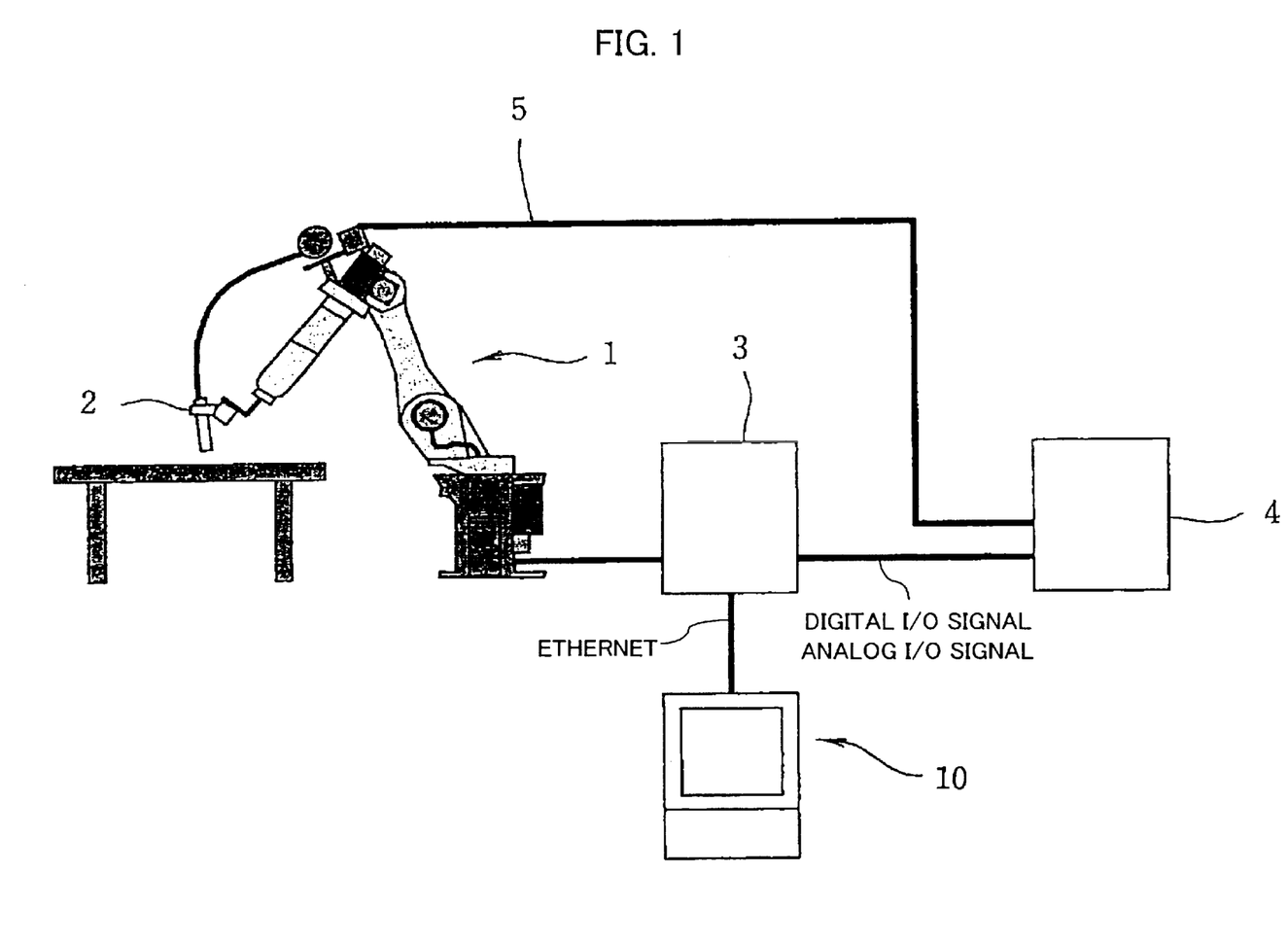
FIG. 1 is a schematic diagram showing an arrangement of a robot system according to a first embodiment of the present invention.
Figure 2:
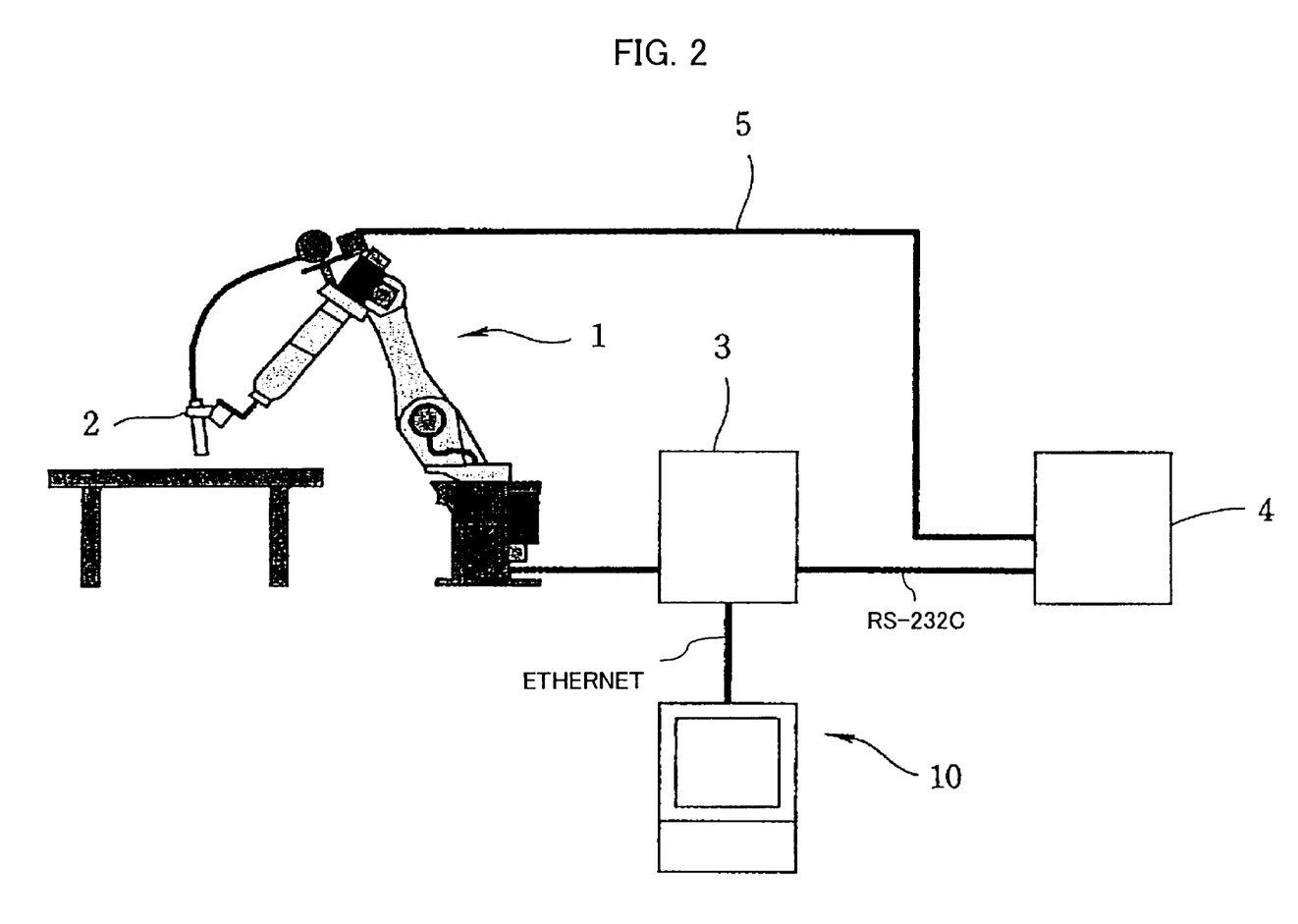
FIG. 2 is a schematic diagram showing an arrangement of a robot system according to second embodiment of the present invention.

FIGS. 1 and 2 schematically show arrangements of robot systems according to first and second embodiments of the present invention, respectively. In these embodiments, the present invention is applied to a welding robot system for performing arc welding operations and data representing an operation state of the welding robot are displayed on a display device.

As shown in FIGS. 1 and 2, essential components of each of the robot. systems comprise a robot 1, an arc welding torch 2 mounted on a distal end of the robot 1, a robot controller 3, a power supply 4 for arc welding, a personal computer 10 with a display device as a data processing device and connecting devices for mutual connection among them.

In the systems of FIGS. 1 and 2, a cable 5 is used for connection between the arc welding power supply 4 and the welding torch 2. The robot 1 and the robot controller 3 are connected with each other by an ordinary cable containing a power cable and a signal cable. The robot controller 3 and the personal computer 10 are connected with each other by means of a network such as Ethernet. Alternatively, the connection between the robot controller 3 and the personal computer 10 may be performed by means of a serial communication such as RS-232C instead of the network communication.

Signal transfer between the robot controller 3 and the arc welding power supply 4 is performed by means of I/O signal in the system shown in FIG. 1, and by means of serial signal using RS-232C interface in the system shown in FIG. 2. The robot controller 3 and the arc welding power supply 4 may be connected by means of a network such as Ethernet.

Signals sent and received between the robot controller 3 and the arc welding power supply 4 include welding start/end signals, a signal for commanding welding current and also signals representing values of actual current supplied to the welding torch 2 from the arc welding power supply 4. As well known in the art, the arc welding power supply 4 has a circuit for monitoring an actual welding current supplied to the welding torch 2, and signals representing values of the monitored actual welding current supplied in arc welding operations are sent to the robot controller 3 from the arc welding power supply 4.

The robot controller 3 mediates the signals of actual welding current received from the arc welding power supply 4 and sends the signals to the personal computer 10. The personal computer 10 records the data in a file (a memory area assigned for recording the welding current values). Data of commanded value of the welding current are also sent from the robot controller 3 to the personal computer 10 and stored to be associated with the actual welding current values in the file in the personal computer 10.

In operation of the robot according to the taught operation program, when an arc start command is read out from the operation program, a welding start command is issued to the arc welding power supply 4. Upon receiving the welding start command, the arc welding power supply 4 starts supply of the welding current to the welding torch 2 to start the arc welding. At the same time, monitoring of the actual welding current is started.

In the arc welding operation, signals representing the actual welding current are sent to the robot controller 3. The robot controller 3 performs sampling of the actual welding current sent from the arc welding power supply 4 at every predetermined sampling period and stores the sampled values in the memory of the controller 3.

When an arc end command is read out from the operation program, the robot controller 3 issues an arc end commend to the arc welding power supply 4. Upon receiving the arc end command, the arc welding power supply 4 terminates the arc welding and stops the output of the monitored welding current.

The robot controller 3 transfers the file containing the recorded values of the welding current to the personal computer 10. In the case where the robot controller 3 and the personal computer 10 are connected with each other by Ethernet, the file is transferred by FTP (File Transfer Protocol) function. As described, the personal computer 10 receives the file containing actual welding current values from the robot controller 3 every time when a welding operation is performed.

The file contains data obtained by sampling the actual welding current at every predetermined sampling period to be recorded as ASCII data in a time series. The personal computer 10 stores the file in the memory.

The personal computer 10 is provided with a software for graphically displaying the data in the form of line graphs and/or icons with indication of a chronological order and time/date of the welding operations on a display screen of the display device. The software for graphic display may be prepared by Visual Basic released from Microsoft Corporation, for example. The line graph is displayed with axis of abscissa indicating time. and axis of ordinate indicating current value (A). The icons are displayed with indications of chronological order of welding operations or time and date associated below.

Figure 5:
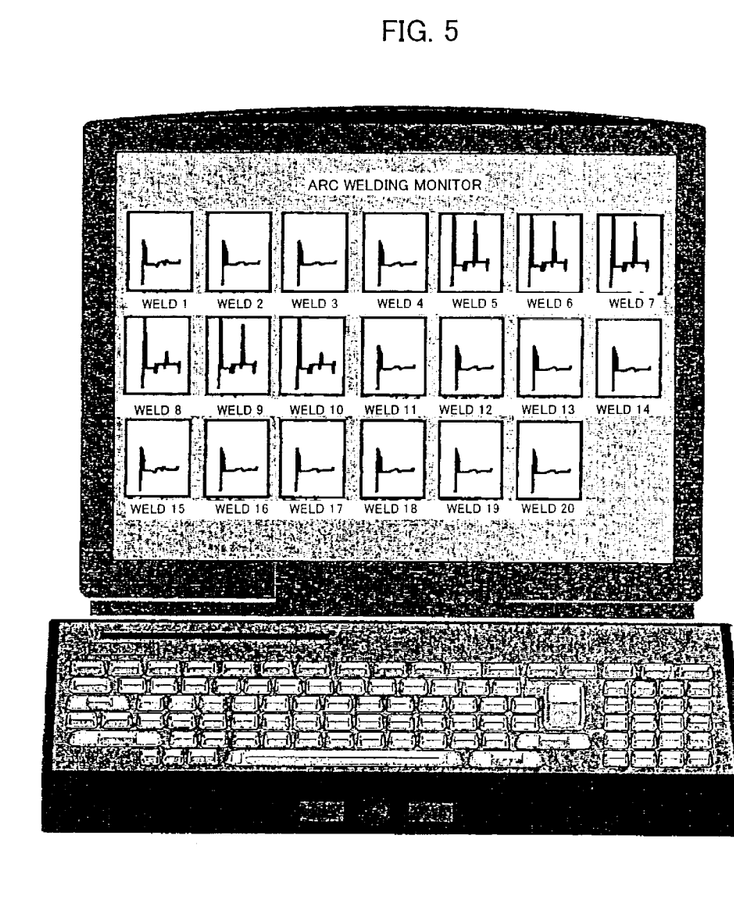
FIG. 5 shows an example of reduced line graphs displayed in the chronological order of welding operations with indication of respective welding numbers in one frame on a display device.

The line graph may be displayed with the axis of abscissa having a reduced size of approximately 20mm by the graphic display software. The stored data are displayed as the line graph sequentially on the display device in accordance with the software. An example of the reduced line graphs displayed on the display device of the personal computer 10 are shown in FIG. 5. The line graphs may be displayed in the order of time/date of the recording of the operation data or chronological order of the operations.

In FIG. 5, the thirteen line graphs of Welding No. 1 (uppermost line, leftmost column) to Welding No. 13 (downmost line, second rightmost column) are displayed in the form of a matrix. As can be seen from FIG. 5, it would be difficult to read the details of the recorded data from the line graphs since these line graphs are displayed in the reduced size, i.e., thumbnail representation, but profiles of the data can be recognized as patterns of the line graphs. This representation is rather advantageous than the conventional representation in that the patterns of the line graphs can be recognized at a glance.

Further, a plurality of operations, welding operations in this example, can be observed by referring the reduced representations of the data at a time on one display screen to allow an operator to recognize an abnormal pattern as a pattern deviating from other normal patterns in the display screen.

The recognized abnormal pattern may be checked by displaying the pattern in different color such as red, to facilitate discrimination of the abnormal pattern. Furthermore, only the abnormal patterns may be displayed on the display screen to make the discrimination of the abnormal patterns from the normal patterns unnecessary.

In this example, the variation of the arc welding current is adopted as the data representing the operation state because abnormality of the welding operation appears as abnormality of the variation of the arc welding current. In particular, a line graph representing the variation of the arc welding current shows a substantially trapezoidal form when the arc welding is performed normally and the trapezoidal form is deformed when an abnormality occurs in the arc welding.

Thus, an operator can easily grasp the tendency of the welding operations such as premonition of abnormal welding operations and whether or not the abnormality occurs in series or occasionally by glancing a series of line graphs as shown in FIG. 5.

Figure 6:
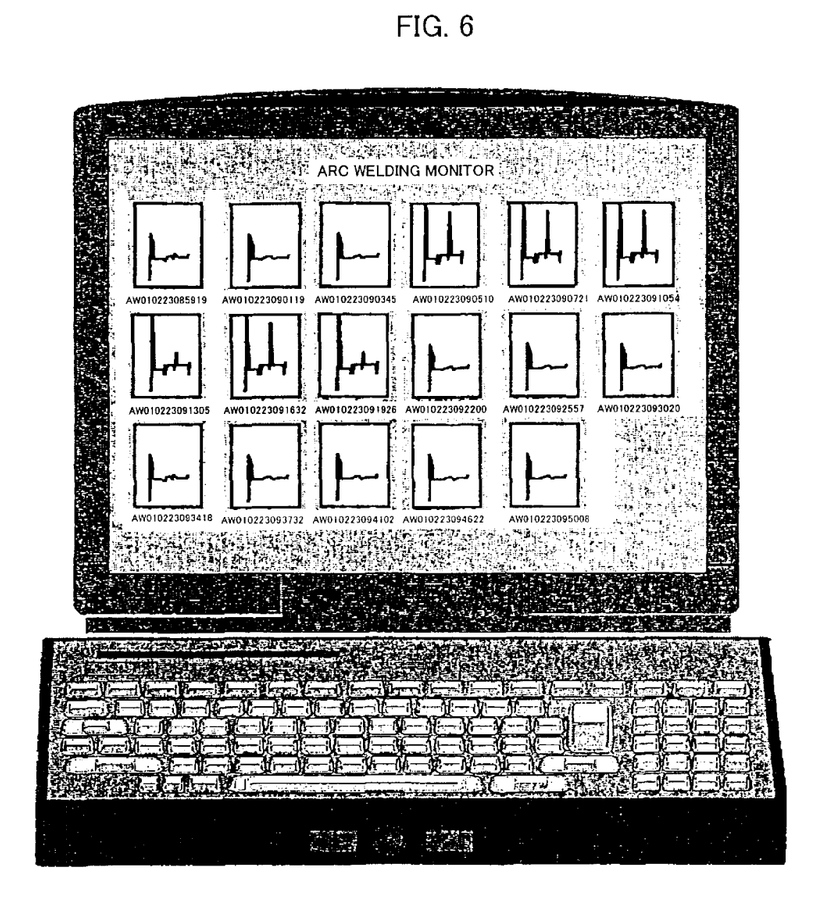
FIG. 6 shows an example of reduced line graphs displayed in the chronological order of welding operations with indication of time/date of the respective operations in one frame on a display device.

Furthermore, the reduced display of the line graphs is changed to a full-scale display by enlarging a particular graph specified by an operator's action of clicking or double-clicking the line graph suspected to have abnormality according to the function of the graphic display software. Thus, each area of the reduced line graphs functions as an icon indicating chronological order or time/date of the arc welding operation. FIG. 5 shows an example of the reduced line graphs displayed in the chronological order of the operations with indication of respective welding numbers, and FIG. 6 shows an example of the reduced line graphs displayed in the chronological order of the operations with indication of time/date of the respective welding operations. In FIG. 6, for example, the icon with indication of AW 010223093418 shows the data recorded at 18 sec. 9:34 on Feb. 23, 2001. Each indication of combined characters and numerals is a file name of the data file stored in a storage device of the personal computer, and each icon with the file name expresses time/date when the data is recorded.

Figure 3:
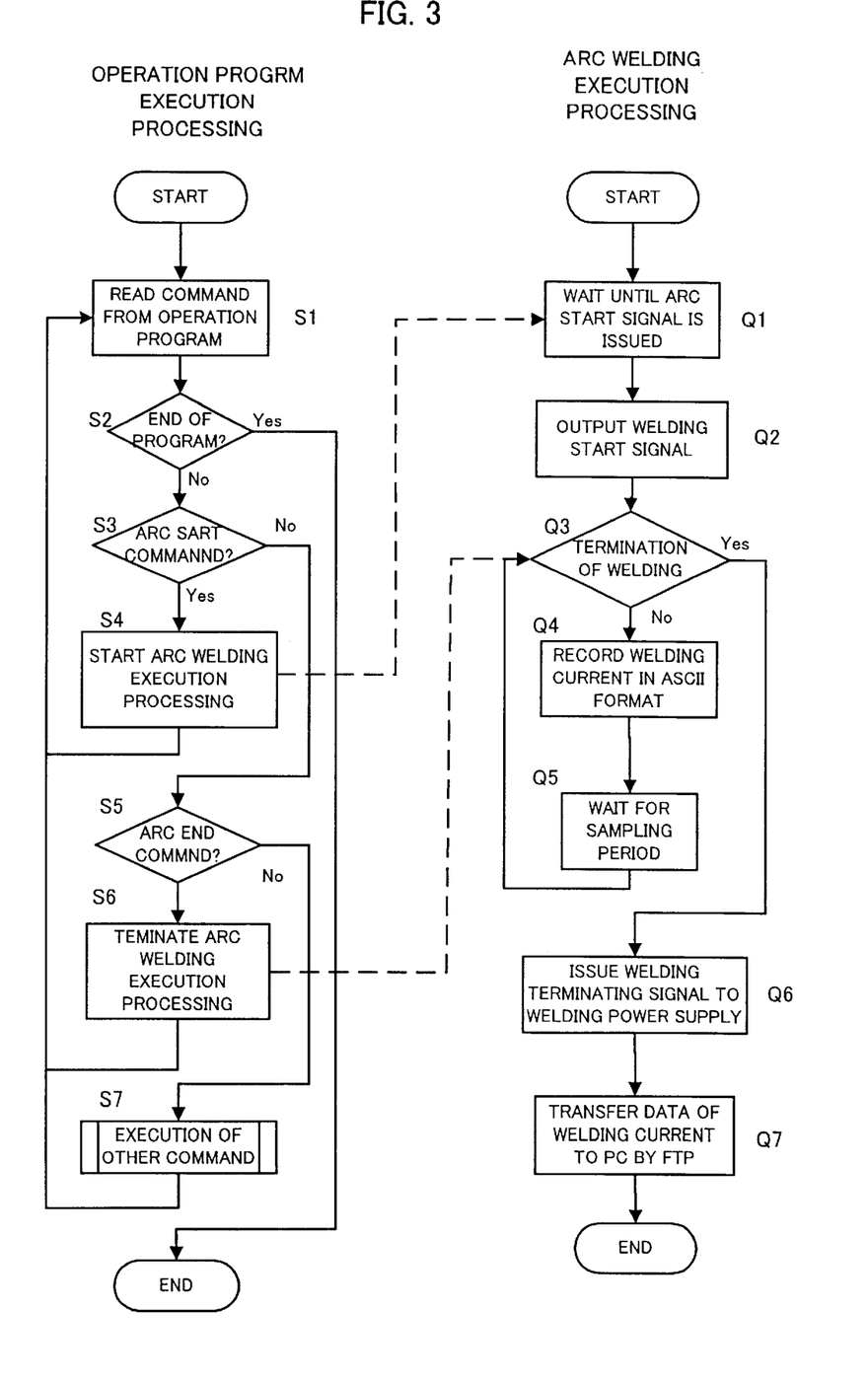
FIG. 3 is a flowchart illustrating processing to be performed by a processor of a robot controller.
Figure 4:
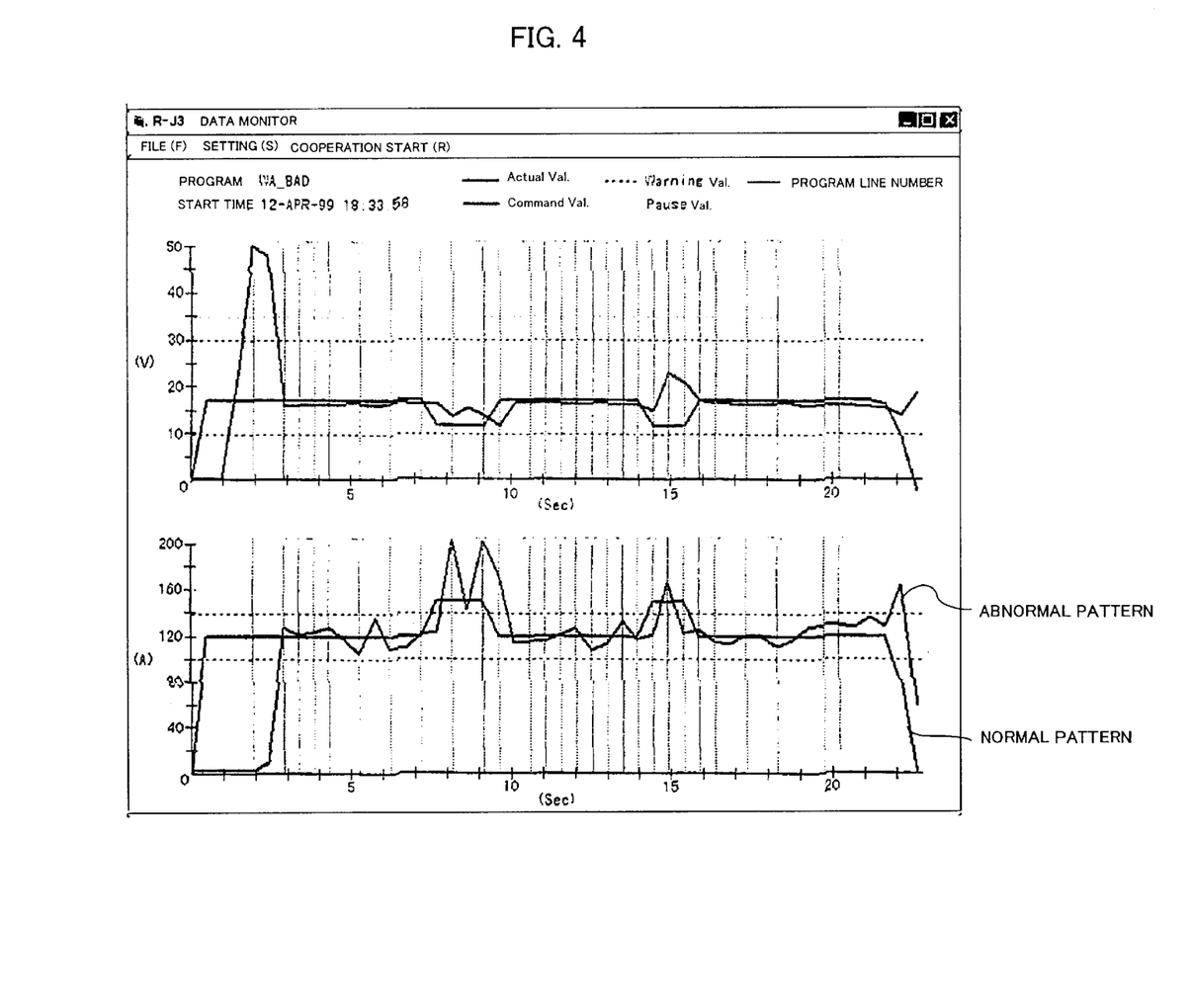
FIG. 4 is a diagram showing an enlarged representation of the operation data in one frame on a display device.

The processing to be performed by the processor (CPU) of the robot controller 3 will be described referring to the flowchart of FIG. 3. The processing comprises processing of executing the taught operation program and processing of executing an arc welding operation including processing of displaying the operation data.

[Operation program execution processing]

Step S1: A command in the operation program is read by the processor of the robot controller 3.

Step S2: It is determined whether or not the command read in Step S1 indicates an end of the program. The procedure proceeds to Step S3 unless the read command indicates an end of the program.

Step S3: It is determined whether or not the read command is an arc start command. The procedure proceeds to Step S4 if the read command is an arc start command and otherwise the procedure proceeds to Step S5.

Step S4: A signal for starting an execution of the arc welding execution processing is issued. With this signal, the arc welding execution processing is started as described later.

Step S5: It is determined whether or not read command is an arc end command. The procedure proceeds to Step S6 if the read command is an arc end command and otherwise the procedure proceeds to Step S7.

Step S6: A signal for terminating the arc welding execution processing is issued. With this signal, the arc welding execution process is terminated as described later.

Step S7: Processing other than the processing for starting/terminating the arc welding execution processing, such as processing for moving the welding torch to a weighing start position is performed and the procedure returns to Step S1.

[Arc welding execution processing]

Step Q1: The processor waits until an arc start signal is issued at Step S4. The procedure proceeds to Step Q2 when the arc start signal is issued.

Step Q2: A signal of commanding start of a welding operation to the welding power supply 4 is issued.

Step Q3: It is determined whether or not the welding operation is to be terminated. The determination is carried out based on whether or not the signal commanding termination of the arc welding execution processing is outputted in Step S6 at that instance. If the signal for terminating the arc welding execution processing is outputted, the procedure proceeds Step Q6 and otherwise the procedure proceeds to Step Q4.

Step Q4: The welding current value sent from the welding power supply 4 is recorded in ASCII format in the memory.

Step Q5: The procedure returns to Step Q3 after elapsing a predetermined waiting period equivalent to the sampling period. The processing of Steps Q3-Q4-Q5-Q3 are repeatedly executed to successively store the data of the welding current until the determination result of Step Q3 is turned "Yes".

Step Q6: A signal of commanding termination of the welding operation is issued to the welding power supply 4.

Step Q7: The data of the recorded welding current values are transferred by the FTP function to the personal computer 10. With the above procedure, the data for one welding operation is sent to the personal computer 10.

The personal computer 10 starts the graphic display software to perform the graphical display of the data as shown in FIG. 5. Every time when one cycle of the above described "arc process execution processing" is completed, a new line graph is added on the display screen. Thus, FIG. 5 shows a graphical display after thirteen cycles of "arc process execution processing" are completed.

According to the present invention, a tendency of operation data on a plurality of operations performed by a robot can be recognized referring to in one frame on a display screen of a display device of a personal computer to facilitate an analysis of the operation data. For example, variations of welding current in arc welding operations performed by an arc welding robot are displayed on the display device in one frame of the display screen to allow an operator to grasp tendency of a plurality of arc welding operations and find abnormality of the arc welding operations visually by sentience.

What is claimed is:

1. An operation data display device for displaying an operation state of a robot, comprising:
   a robot controller for controlling the robot to perform operations in accordance with an operation program; and
   a data processing device connected with said robot controller,
   wherein said robot controller includes means for obtaining operation data on an operation state of the robot for each operation of the robot and storing the operation data in time series, and means for transferring the stored operation data to said data processing device, and said data processing device includes storing means for storing the operation data transferred from said robot controller, a display device for providing a frame of picture on a display screen and means for displaying a plurality of representations of the stored operation data on a plurality of robot operations in the form of graphs of reduced size in one frame on the display screen.

2. An operation data display device according to claim 1, wherein said data processing device further includes means for allowing selection of one of the plurality of representations of the operation data and displaying only the selected one in the form of a graph of enlarged size in one frame on the display screen.

3. An operation data display device according to claim 1, wherein the operations performed by the robot are arc welding operations and said operation data are indicative of welding current in the arc welding operation.

4. An operation data display device according to claim 1, wherein said data processing device further includes means for displaying a plurality of representations of the stored operation data in the form of icons with indications of sequence or time/date of the operations in one frame on the display screen.

5. An operation data display device according to claim 1, wherein said data processing device further includes means for allowing addition of a mark indicating abnormality of the operation data on the representation thereof.

6. An operation data display device according to claim 1, wherein said data processing device further includes means for sorting the representations of the operation data in time series in one frame on the display screen.

7. An operation data display device according to claim 1, wherein said data processing device further includes means for displaying only the representations of the abnormal operation data in one frame on the display screen.

8. An operation data display device for displaying an operation state of a robot, comprising:
- a robot controller for controlling the robot to perform operations in accordance with an operation program; and
- a data processing device connected with said robot controller,
- wherein said robot controller includes means for successively obtaining operation data on an operation state of the robot for each operation of the robot and means for transferring the operation data to said data processing device, and said data processing device includes storing means for storing the operation data transferred from said robot controller in time series, a display device for providing a frame of picture on a display screen and means for displaying a plurality of representations of the operation data on a plurality of robot operations in the form of graphs of reduced size in one frame on the display screen of said display device.

9. An operation data display device according to claim 8, wherein said data processing device further includes means for allowing selection of one of the plurality of representations of the operation data and displaying only the selected one in the form of a graph of enlarged size in one frame on the display screen.

10. An operation data display device according to claim 8, wherein the operations performed by the robot are arc welding operations and said operation data are indicative of welding current in the arc welding operation.

11. An operation data display device according to claim 8, wherein said data processing device further includes means for displaying a plurality of representations of the stored operation data in the form of icons with indications of sequence or time/date of the operations in one frame on the display screen.

12. An operation data display device according to claim 8, wherein said data processing device further includes means for allowing addition of a mark indicating abnormality of the operation data on the representation thereof.

13. An operation data display device according to claim 8, wherein said data processing device further includes means for sorting the representations of the operation data in time series in one frame on the display screen.

14. An operation data display device according to claim 8, wherein said data processing device further includes means for displaying only the representations of the abnormal operation data in one frame on the display screen.

* * * * *